US010954922B2

(12) United States Patent
Hardwicke, Jr. et al.

(10) Patent No.: US 10,954,922 B2
(45) Date of Patent: Mar. 23, 2021

(54) SYSTEM AND METHOD FOR COOLING A TOWER OF A WIND TURBINE

(71) Applicant: General Electric Company, Schenectady, NY (US)

(72) Inventors: Edward Wayne Hardwicke, Jr., Greenville, SC (US); Alisha Candace Taylor, Greer, SC (US); Samir Armando Salamah, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/435,748

(22) Filed: Jun. 10, 2019

(65) Prior Publication Data

US 2020/0386210 A1    Dec. 10, 2020

(51) Int. Cl.
*F03D 80/60*    (2016.01)
*F28F 19/01*    (2006.01)

(52) U.S. Cl.
CPC .............. *F03D 80/60* (2016.05); *F28F 19/01* (2013.01); *F05B 2240/14* (2013.01); *F05B 2240/801* (2013.01); *F05B 2260/20* (2013.01)

(58) Field of Classification Search
CPC .......... F03D 13/20; F03D 13/22; F03D 80/00; F03D 80/60; F28F 19/01; F05D 2260/20; F05D 2260/64; F05B 2240/14; F05B 2240/801
See application file for complete search history.

(56) References Cited

U.S. PATENT DOCUMENTS

| 2,506,978 | A  | 5/1950  | Imterberger |
| 3,159,093 | A  | 12/1964 | Rosenfeld |
| 3,698,308 | A  | 10/1972 | Navara |
| 3,768,016 | A  | 10/1973 | Townsend et al. |
| 4,915,590 | A  | 4/1990  | Eckland et al. |
| 6,357,549 | B1 | 3/2002  | Brennan et al. |
| 6,408,575 | B1 | 6/2002  | Yoshida et al. |
| 6,470,645 | B1 | 10/2002 | Maliszewski et al. |
| 6,532,700 | B1 | 3/2003  | Maliszewski et al. |
| 6,672,021 | B2 | 1/2004  | Kusano et al. |
| 6,676,122 | B1 | 1/2004  | Wobben |

(Continued)

FOREIGN PATENT DOCUMENTS

CN    202096855 U  *  1/2012
CN    103498766 A  *  1/2014

(Continued)

OTHER PUBLICATIONS

European Search Report, Nov. 18, 2020, for EP Application No. 20179299.1.

*Primary Examiner* — Michael Lebentritt
*Assistant Examiner* — Jesse M Prager
(74) *Attorney, Agent, or Firm* — Dority & Manning, P.A.

(57) ABSTRACT

A system for cooling a tower of a wind turbine including at least one cooling fluid inlet arranged in a tower wall for receiving a cooling fluid into the tower, a filtration assembly arranged within the tower, and at least one cooling fluid outlet for directing the filtered cooling fluid within the tower. The filtration assembly including a plurality of flow guiding structures that define a plurality of flow paths for providing a plurality of flow direction changes and/or flow velocity changes to the cooling fluid.

20 Claims, 5 Drawing Sheets

(56) References Cited

U.S. PATENT DOCUMENTS

| | | |
|---|---|---|
| 7,238,105 B2 | 7/2007 | Reinders |
| 8,961,110 B2 | 2/2015 | Johansen |
| 9,175,491 B2 | 11/2015 | Gawrisch et al. |
| 9,347,236 B2 | 5/2016 | Gawrisch et al. |
| 2010/0095617 A1 | 4/2010 | Scholte-Wassink |
| 2011/0001371 A1* | 1/2011 | Landeta Manzano ................ B01D 46/023 310/58 |
| 2011/0163545 A1* | 7/2011 | Hirai ................ B01D 46/0086 290/44 |
| 2012/0032448 A1 | 2/2012 | Sato et al. |
| 2012/0168116 A1* | 7/2012 | Mello ................ E02B 17/02 165/47 |
| 2013/0009405 A1 | 1/2013 | Sato et al. |
| 2013/0283741 A1* | 10/2013 | Roughton ............ B01D 45/06 55/323 |
| 2017/0009746 A1 | 1/2017 | Jain et al. |
| 2018/0080435 A1* | 3/2018 | Ma ................ H02K 7/1838 |
| 2018/0283361 A1* | 10/2018 | Wu ................ F03D 13/20 |

FOREIGN PATENT DOCUMENTS

| | | | |
|---|---|---|---|
| CN | 203717254 U | * | 7/2014 |
| CN | 105134508 A | | 12/2015 |
| CN | 205841110 U | | 12/2016 |
| WO | WO-2010015674 A2 | * 2/2010 | ............ F03D 80/60 |

* cited by examiner

SYSTEM AND METHOD FOR COOLING A TOWER OF A WIND TURBINE

FIELD

The present disclosure relates in general to wind turbines, and more particularly to systems and methods for cooling a tower of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. More specifically, in many wind turbines, the gearbox is mounted to the bedplate via one or more torque arms or arms. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy the electrical energy may be transmitted to a converter and/or a transformer housed within the tower and subsequently deployed to a utility grid.

Many of the components of a wind turbine have a tendency to generate heat and therefore, must be cooled. One method for cooling the components is using airflow. In order to achieve such cooling, air must be able to enter the tower in a sufficient quantity, with the same quantity of air being able to exit the tower. A significant portion of air used for cooling in conventional wind turbines is introduced through the tower door. Due to structural concerns, it is generally undesirable to form additional openings in the tower. As such, the amount of air available for cooling the wind turbine is normally limited by the surface area of the tower door.

In addition, in order to minimize ingestion of undesirable contaminants (e.g., sand, debris, etc.), a filter is often integral to the door. As such, the filter is designed to entrap contaminants while permitting a portion of the air to pass through. In order to prevent unauthorized entry into the tower, these filters are often covered with louvers or grates. The combination of the entry barriers and the filter results in a pressure drop for the air entering the tower that is typically between 50 Pa and 100 Pa. The pressure drop, in combination with the limits imposed by the size of the door, may result in a restricted airflow that is insufficient to provide the desired level of cooling for the wind turbine.

Thus, the art is continuously seeking new and improved systems and methods for increasing the quantity of filtered air available for cooling in the wind turbine. Accordingly, a system and method for cooling a tower of a wind turbine that addresses the aforementioned issues would be advantageous.

BRIEF DESCRIPTION

Aspects and advantages of the invention will be set forth in part in the following description, or may be obvious from the description, or may be learned through practice of the invention.

In one aspect, the present disclosure is directed to a system for cooling a tower of a wind turbine. The system may include at least one cooling fluid inlet for receiving a cooling fluid into the tower. The at least one cooling fluid inlet may be arranged in a tower wall of the tower of the wind turbine. The system may also include a filtration assembly arranged within the tower. The filtration assembly may include a plurality of flow guiding structures that define a plurality of flow paths for providing a plurality of flow direction changes and/or flow velocity changes to the cooling fluid. Additionally, the system may include at least one cooling fluid outlet for directing the filtered cooling fluid within the tower.

In an embodiment, the cooling fluid inlet(s) may be set within at least one of a tower door or a tower door frame of the tower.

In an embodiment, one or more of the plurality of flow guiding structures may be integral with at least one platform positioned within the tower at a predetermined height above a foundation of the wind turbine. Also, in an embodiment, the plurality of flow guiding structures may be positioned between the platform(s) and the foundation. In an additional embodiment, the plurality of flow paths may direct the cooling fluid entering the cooling fluid inlet(s) towards the foundation through the platform(s) and/or to at least one side of the platform(s).

In a further embodiment, the system may include a tower filtration assembly positioned between the platform(s) and a nacelle of the wind turbine. The tower filtration assembly may be in fluid communication with the cooling fluid outlet(s). The tower filtration assembly may include at least one of a filter element or the plurality of flow guiding structures.

In an embodiment, the plurality of flow guiding structures may define a plurality of 180-degree turns for the cooling fluid.

In an embodiment, the filtration assembly may include at least one of a filter element or particle separation element for further filtering the cooling fluid as the cooling fluid flows through the plurality of flow guiding structures and/or exits the cooling fluid outlet(s).

In an additional embodiment, the system may include a maintenance location arranged adjacent to one or more of the plurality of flow guiding structures. The maintenance location may provide access to the plurality of flow guiding structures such that the filtration assembly can be cleaned and/or replaced. In a further embodiment, the maintenance location may be an access door integral with at least one of a vertical side of the filter assembly or the at least one platform.

In an embodiment, the system may also include at least one flow sensor in fluid communication with the cooling fluid inlet(s) and/or the cooling fluid outlet(s) so as to monitor a flow rate of the cooling fluid.

In a further embodiment, the system may include at least one of a blower or a fan positioned within the tower and oriented so as to increase a flow of the cooling fluid through the plurality of flow guiding structures.

In another aspect, the present disclosure is directed to a method for cooling a tower of a wind turbine. The method may include receiving cooling fluid through at least one cooling fluid inlet and into the tower. The method may also include directing the cooling fluid through a filtration assembly within the tower. The filtration assembly may include a plurality of flow guiding structures that define a plurality of flow paths for providing a plurality of flow direction changes and/or flow velocity changes to the cooling fluid. Additionally, the method may include directing the filtered cooling fluid through at least one cooling fluid outlet so as to cool one or more wind turbine components within the tower.

In an embodiment, directing the cooling fluid through the filtration assembly may include directing the cooling fluid through at least one flow guiding structure of the plurality flow guiding structures that is integral with at least one platform positioned within the tower a predetermined height above the foundation of the wind turbine. In an additional embodiment, directing the cooling fluid through the filtration assembly within the tower may include directing the cooling fluid towards the foundation through the platform(s) and/or to at least one side of the platform(s). It should be further understood that the method may include any of the additional steps and/or features described herein.

In another aspect, the present disclosure is directed to a wind turbine. The wind turbine may include a tower secured atop a foundation, a nacelle mounted atop the tower, a rotor mounted to the nacelle, and at least one platform positioned within the tower at a predetermined height above the foundation. The wind turbine may also include a cooling system positioned within the tower. The cooling system may include at least one cooling fluid inlet arranged in a wall of the tower of the wind turbine. The cooling system may also include a filtration assembly in fluid communication with the cooling fluid inlet(s) and positioned between the platform and the foundation. The filtration assembly may include a plurality of flow guiding structures that define a plurality of flow paths for providing a plurality of flow direction changes and/or flow velocity changes to the cooling fluid. Additionally, the cooling system may include at least one cooling fluid outlet in fluid communication with the filtration assembly and positioned so as to direct the filtered cooling fluid within the tower.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
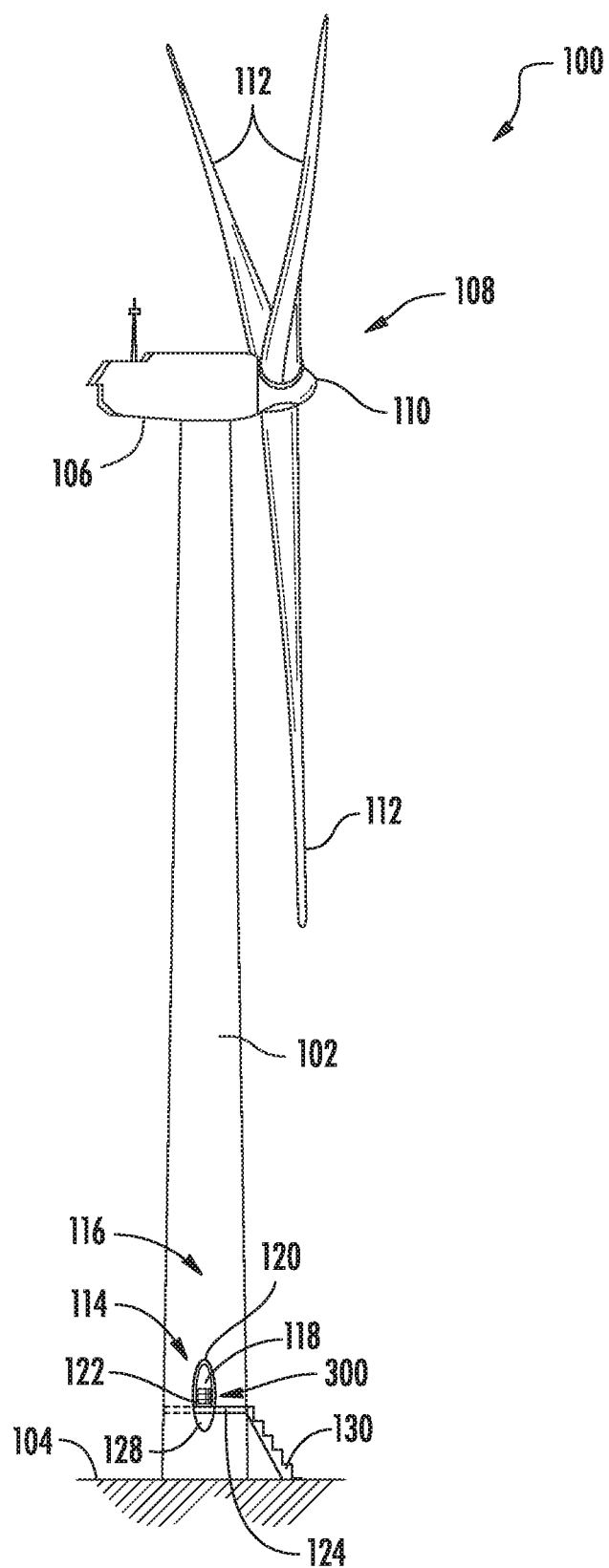
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" are used in reference to the direction of the flow of a cooling fluid from a point of entry into the wind turbine to a point of exit from the wind turbine.

Generally, the present disclosure is directed to a system and method for cooling a tower of a wind turbine. The system may include a cooling fluid inlet arranged in a wall of a tower of the wind turbine. Cooling fluid (e.g., unfiltered, ambient air) may be received by the cooling fluid inlet and brought into the tower. The cooling fluid may be directed to a filtration assembly arranged within the tower. The filtration assembly may have any number of flow guiding structures that define a desired number of flow paths for the cooling fluid. The number of flow paths may provide a plurality of flow direction changes and/or flow velocity changes to the cooling fluid. With each direction and/or flow velocity change, a portion of particles may settle out of the cooling fluid flow. As a result, the cooling fluid may exit the filtration assembly as filtered cooling fluid (e.g., filtered, ambient air). The filtered cooling fluid may be directed through a cooling fluid outlet also located within the tower, to cool the interior of the tower.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106 mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

Access to the interior of the wind turbine 100 may be provided through an entryway 114 defined by the tower wall 116 of the tower 102. Further, as shown, the entryway 114 may be positioned between the support surface 104 and the nacelle 106. Moreover, as shown, the entryway 114 may include a tower door 118 set within a tower door frame 120. In an embodiment, a threshold 122 of the tower door 118, and the corresponding opening of the door frame 120, may be essentially flat and parallel with a horizontal plane to facilitate passage into and out of the wind turbine 100.

In addition, as shown, an entry landing 124 may be coupled exterior to the tower wall 116. The entry landing 124 may intersect the tower door frame 120 at a location between the threshold 122 and the support surface 104. The tower door frame 120 may have a first tower door frame portion 126 positioned above the entry landing 124, and a second tower door frame portion 128 positioned below the entry landing 124. Access to the entry landing 124 may be provided by at least one staircase 130 coupled between the support surface 104 and the entry landing 124.

Figure 2:
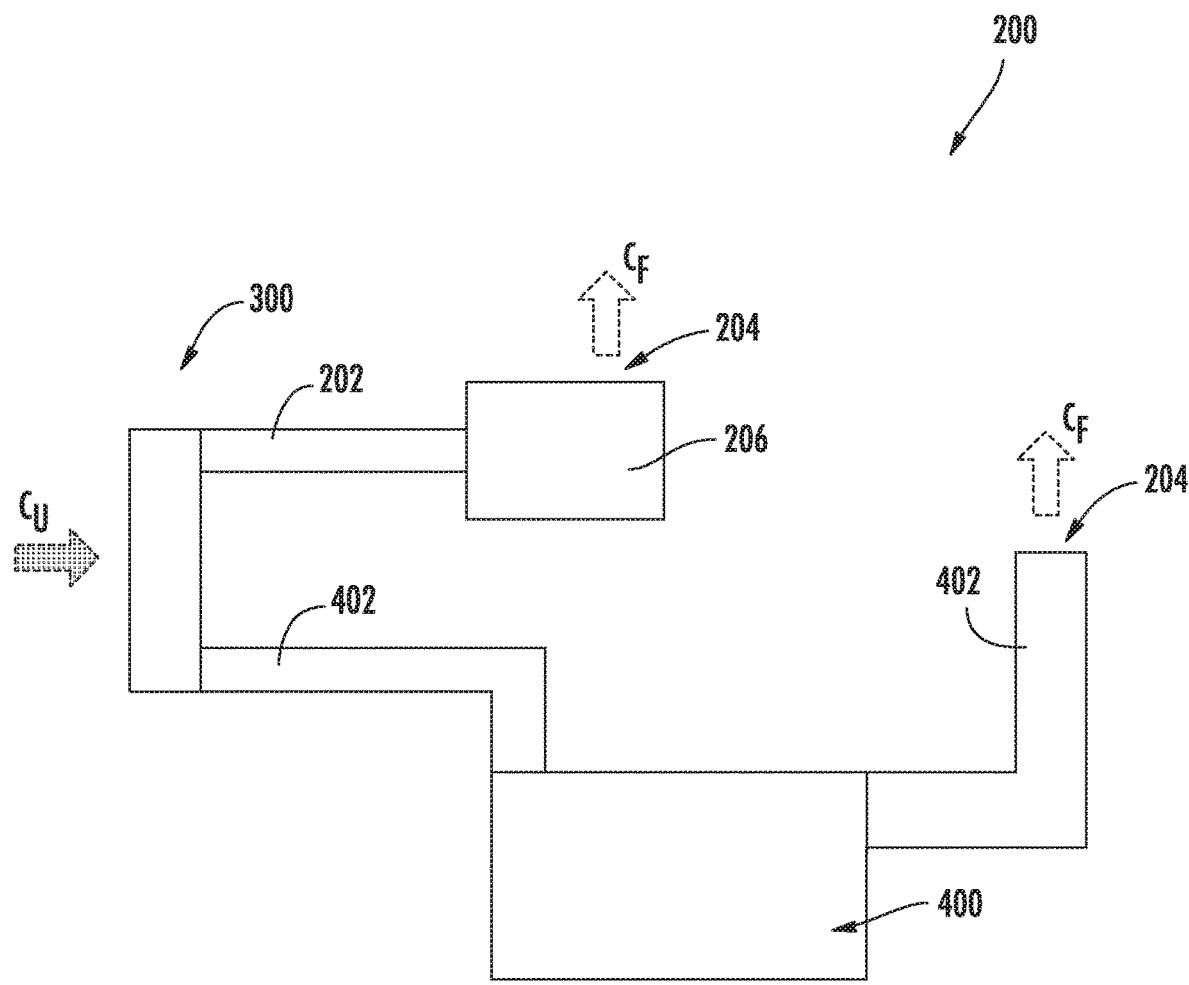
FIG. 2 illustrates a simplified schematic view of one embodiment of a cooling system for a wind turbine according to the present disclosure.

Referring now to FIG. 2, a simplified schematic view of one embodiment of a cooling system 200 according to the present disclosure is illustrated. As shown, the cooling system 200 may include at least one cooling fluid inlet 300 for receiving a cooling fluid ($C_U$). In an embodiment, the cooling fluid ($C_U$) may be a portion of unfiltered ambient air drawn from the surroundings. In such embodiments, the cooling fluid ($C_U$) drawn from the ambient air may include a quantity of undesirable contaminants, such as sand or other particulate matter suspended in the flow.

In an embodiment, the flow of the cooling fluid ($C_U$) may be directed within the tower 102 by a plurality of flow guiding structures 402. The flow guiding structures 402 may include a plurality of plenums or ducts configured to direct the cooling fluid ($C_U$). For example, in an embodiment, a tower filtration duct 202 may fluidly couple the cooling fluid inlet 300 to at least one cooling fluid outlet 204 within the tower 102.

Still referring to FIG. 2, in an embodiment, the cooling system 200 may include a filtration assembly 400 arranged within the tower 102. As such, the filtration assembly 400 may be configured to remove contaminants from the cooling fluid ($C_U$) and develop a filtered cooling fluid ($C_F$). The amount of particulates to be removed from the cooling fluid ($C_U$) may be determined by the level of particulate contamination in the ambient air and the magnitude of the airflow required to achieve the desired cooling effects within the tower 102.

For example, if the wind turbine 100 were to be sited in a desert environment having a high quantity of airborne dust, the level of filtration required by the filtration assembly 400 may be greater than for a wind turbine 100 sited offshore. Additionally, the filtration assembly 400 may be configured to develop the filtered cooling fluid ($C_F$) while minimizing a pressure drop for a given flow rate of the cooling fluid ($C_U$, $C_F$) across the filter assembly. For example, in an embodiment, the filtration assembly 400 may cause a drop in the flow rate of the cooling fluid ($C_U$) which is less than 50 Pa (e.g., 5-15 Pa, 15-25 Pa, or 25 to less than 50 Pa).

In an embodiment, such as depicted in FIG. 2, the cooling system 200 may also include a tower filtration assembly 206, which will be discussed in more detail below. The tower filtration assembly 206 may be fluidly coupled by a tower filtration duct 202 between the cooling fluid inlet 300 and the cooling fluid outlet 204. The tower filtration assembly 206 may be configured to operate in conjunction with, or independently of, the filtration assembly 400 to provide a filtered cooling flow ($C_F$) to the turbine tower 102.

Figure 3:
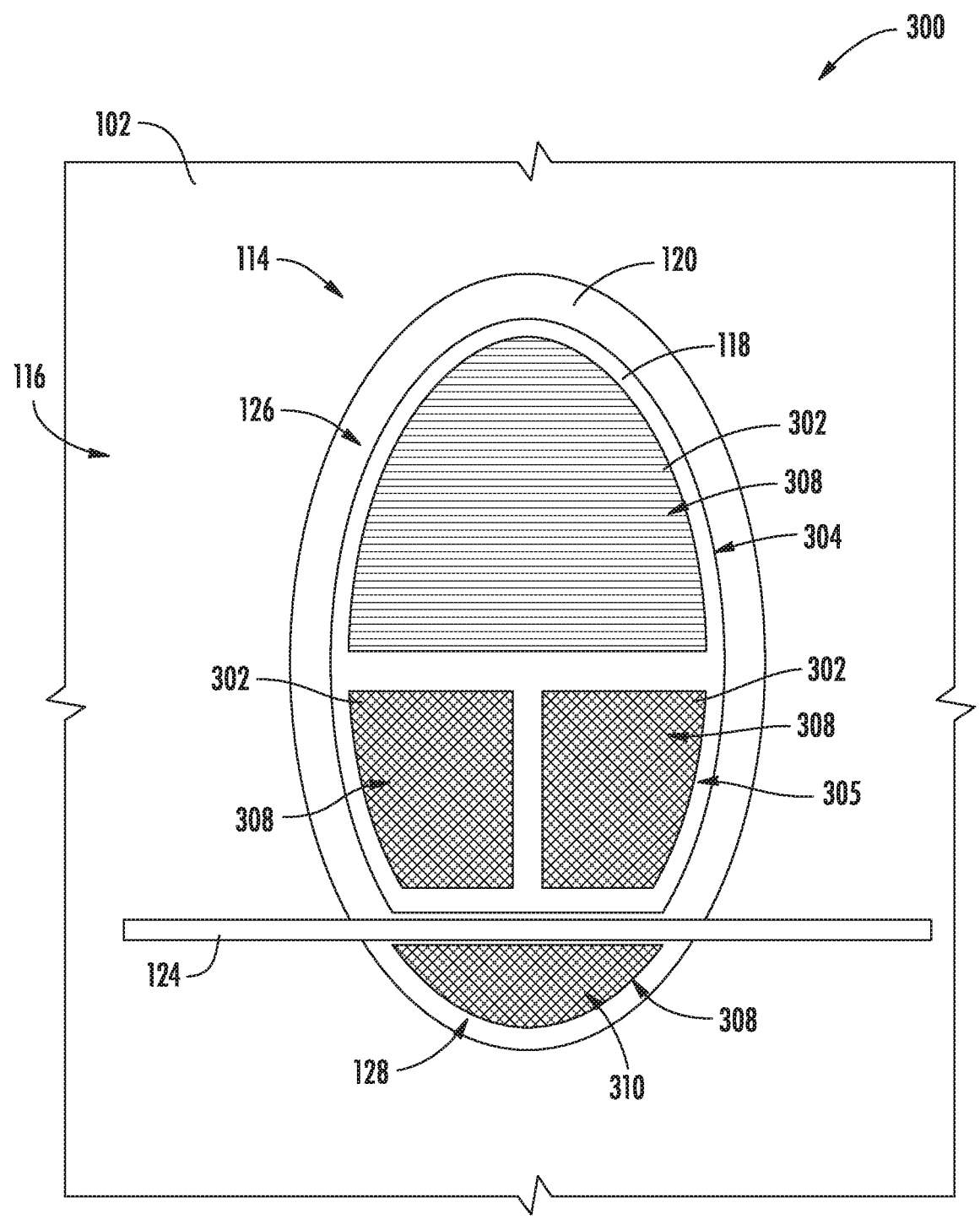
FIG. 3 illustrates a front view of one embodiment of a cooling fluid inlet according to the present disclosure, particularly illustrating a door arranged in a door frame of a wall of a tower of the wind turbine.

Referring now to FIG. 3, a front view of one embodiment of the at least one cooling fluid inlet 300 is depicted according to the present disclosure. In at least one embodiment, the cooling fluid inlet 300 may be set within at least one of the tower door 118 and/or the tower door frame 120 of the tower 102.

In an embodiment, the cooling fluid inlet 300 may include at least one opening 302 defined by the tower door 118. More specifically, as shown, the cooling fluid inlet 300 includes a plurality of openings 302. In other embodiments, the cooling fluid inlet 300 may include a single opening having a large area, a plurality of smaller openings having a smaller area, or combinations thereof. For example, as is depicted in FIG. 3, a single, large opening may be defined by an upper portion 304 of the tower door 118, and a lower portion 305 of the door 118 may be divided into a plurality of smaller openings. It should be appreciated that a single, large opening may maximize the area through which cooling fluid ($C_U$) may be drawn, while a plurality of smaller openings may serve as a barrier to an unauthorized entry into the tower 102.

In at least one embodiment, the opening(s) 302 may be partially obstructed by an entry barrier 308. The entry barrier 308 may be configured to resist the entry of a human or wildlife into the tower 102. For example, the entry barrier 308 may be a screen or grate coupled to the tower door 118. The screen or grate may be particularly well suited when other barriers to entry, such as a limited opening size, are present.

In an additional embodiment, the entry barrier 308 may be a plurality of louvers or bars coupled to the tower door 118. It may be desirable to install a plurality of louvers or bars when other barriers to entry are not present and a need for increased security may exist. For example, in an embodiment wherein a single, large opening is defined by the tower door 118, a screen or grate may be inadequate to prevent the forcible entry of a human into the tower 102. It should, however, be appreciated that a plurality of louvers having sufficient structure to resist the forcible entry of a human, may reduce the effective surface area of the opening(s) 302.

Figure 4:
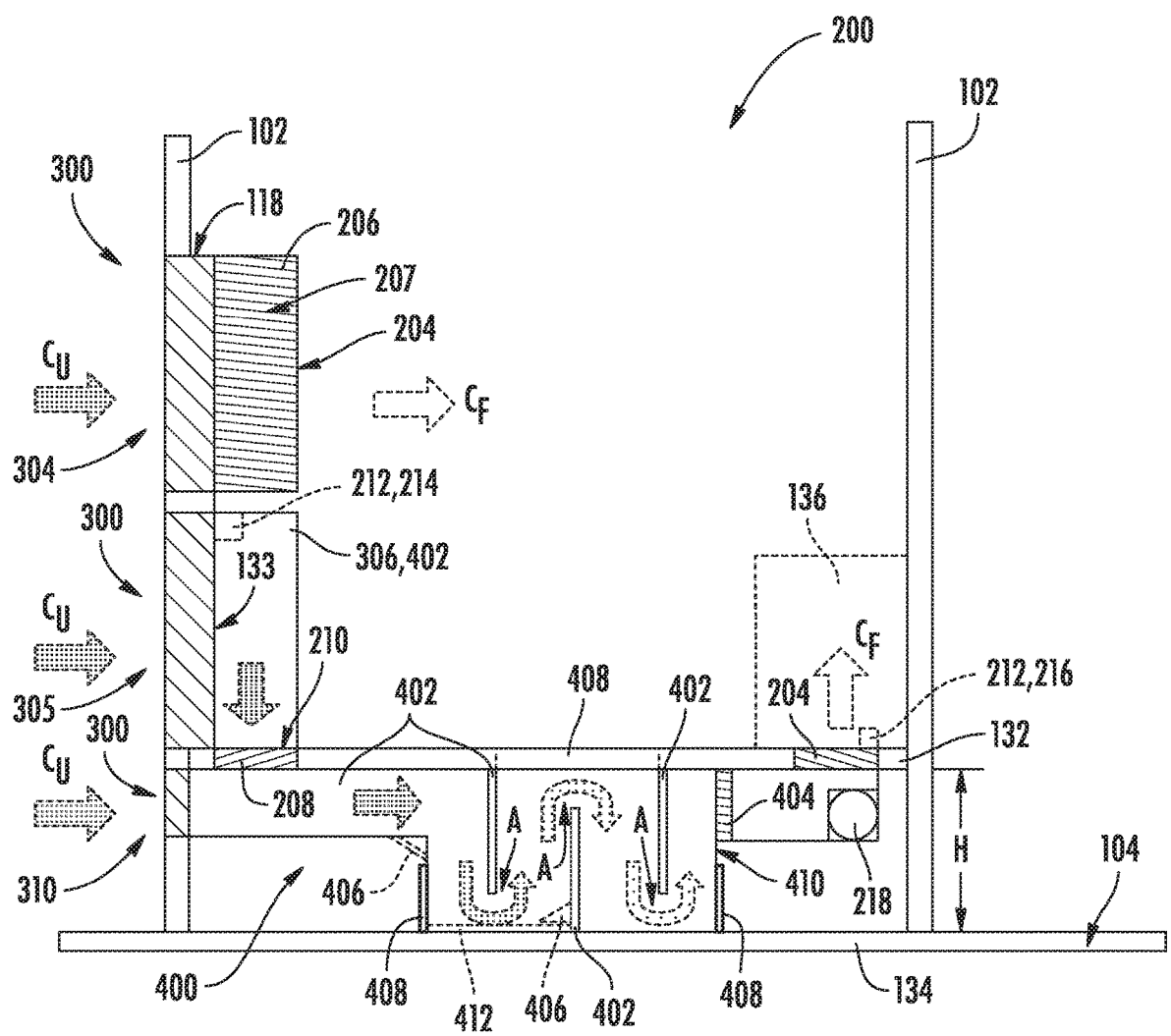
FIG. 4 illustrates a cross-sectional schematic view of one embodiment of a system for cooling a tower of a wind turbine according to the present disclosure.

In at least one embodiment, as shown in FIGS. 3 and 4, the cooling fluid inlet(s) 300 may also include an intake plenum 306 coupled to an inner face 133 (FIG. 4) of the tower door 118. As shown particularly in FIG. 3, the intake plenum 306 may be positioned to surround the opening 302 and may be a flow guiding structure 402. In an exemplary embodiment, the intake plenum 306 may form a solid barrier to a forcible entry into the tower 102 and may serve as an augmentation of the entry barrier 308. For example, the intake plenum 306 may be formed from sheet-metal or a composite sheet. It should be appreciated that the utilization of the intake plenum 306 may reduce the need for other extensive barriers to the forcible entry of a human, such as a plurality of louvers or bars, or reducing the surface area of the opening 302. In an embodiment including the intake plenum 306, a screen or grate may be included so as to prevent animal entry into the tower 102.

Still referring to FIG. 3, in an embodiment, the cooling fluid inlet(s) 300 may also include a frame opening 310 defined by the door frame 120. In an embodiment, the frame opening 310 may be defined in the second tower door frame portion 128. As such, the frame opening 310 may be disposed between the entry landing 124 and the support surface 104. Similar to the opening(s) 302 of the tower door 118, the frame opening 310 may be partially obstructed by the entry barrier 308. It should be appreciated that the frame opening 310 may also be located in the first tower door frame portion 126 (in addition to the second tower door frame portion 128). Alternatively, a plurality of door frame openings 310 may be disposed at various locations defined by the tower door frame 120.

Referring to FIGS. 2 and 4, the system 200 may also include a filtration assembly 400 arranged within the tower 102. The filtration assembly 400 may include a plurality of flow guiding structures 402. Further, the flow guiding structures 402 may define a plurality of flow paths for providing a plurality of flow direction changes and/or flow velocity changes to the cooling fluid ($C_U$).

In an embodiment, such as depicted in FIG. 4, the plurality of flow guiding structures 402 may define a tortured path for the cooling fluid ($C_U$). For example, in at least one embodiment, the plurality of flow guiding structures 402 may define a plurality of 180-degree turns (A) for the cooling fluid ($C_U$). In such an embodiment, the plurality of flow direction changes may result in a deceleration of the cooling fluid ($C_U$). As the cooling fluid ($C_U$) flows through the various flow direction changes, the energy of the cooling flow may decrease to a point where the cooling flow is no longer able to support a portion of the particulate matter contained therein and at least portions of the particulate matter may settle out of the cooling fluid. In particular, as the cooling fluid ($C_U$) changes direction, the decelerating cooling fluid ($C_U$) may lack the necessary energy to overcome the inertia of the particulate matter. As a result, a portion of the particular matter may depart the flow of the cooling fluid ($C_U$) by continuing along its previous path as the cooling fluid ($C_U$) changes direction. It should be appreciated that the number flow direction changes and/or flow velocity changes may be varied in order to achieve a desired level of particulate separation, or filtration. It should be further appreciated that with a greater number of flow direction changes and/or flow velocity changes, may come a higher degree of particle removal from the filtered cooling fluid ($C_F$).

Still referring to FIG. 4, in certain embodiments, it may be desirable to further control the quality of the filtered cooling fluid ($C_F$). In such an embodiment, the amount of particulate matter removed from the cooling fluid ($C_U$) may be increased by the inclusion of a filter element 404 upstream of the cooling fluid outlet(s) 204. The filter element 404 may be a synthetic or natural mesh filter media. It should be appreciated that the filtration assembly 400 may include any number of filter elements 404. For example, a plurality of filter elements 404 may be disposed at various locations along the tortured path of the filtration assembly 400. Alternatively, in an embodiment, the number flow direction changes and/or flow velocity changes may be reduced and the number of filter elements 404 may be increased so that the filtration assembly 400 may include more filter elements 404 than flow guiding structures 402.

In an additional embodiment, the filtration assembly 400 may also include at least one particle separation element 406. The particle separation element 406 may be positioned in fluid contact with the flow paths defined by the flow guiding structures 402. The particle separation element 406 may be oriented so that the inertia of a portion of the particulate matter carried by the cooling fluid ($C_U$) may carry the portion of the particular matter into the particle separation element 406. As such, the particle separation element 406 may form a scavenge plenum disposed within the filtration assembly 400.

Still referring to FIG. 4, one or more of the plurality of flow guiding structures 402 may, in an embodiment, be integral with at least one platform 132 positioned within the tower 102. In an embodiment, the platform 132 may be a platform that supports equipment and/or facilitates human entry. For example, the platform 132 may be a down tower assembly (DTA) platform supporting various DTA components 136 (e.g., a converter and/or a transformer). Thus, the platform 132 may be positioned a predetermined height (H) above a foundation 134 of the wind turbine 100. It should be appreciated that positioning the platform 132 the predetermined height (H) above the foundation 134 may create a space within the tower 102 between the platform 132 and the foundation 134 that may be free of DTA components 136. This space between the platform 132 and the foundation 134 may provide a convenient location for the installation of additional equipment, such as the filtration assembly 400. It should be appreciated that the space between the platform 132 and the foundation 134 may enable an increase in an effective filter area of the filtration assembly 400. The increase in the effective filter area of the filtration assembly 400 may reduce pressure drop and increase airflow through the tower 102 relative to the pressure drop in airflow through a conventional, door-installed filter.

In another embodiment, such as depicted in FIG. 4, the filtration assembly 400, including the corresponding flow guiding structures 402, may be positioned between the platform 132 and the foundation 134. In an alternative embodiment, the filtration assembly 400 may be positioned between the platform(s) 132 and the nacelle 106. For example, in at least one embodiment, the filtration assembly 400 may be formed so as to have an annular structure conforming to the geometry of the tower wall 116.

In an embodiment, the flow guiding structures 402 may establish a plurality of flow paths which direct the cooling fluid ($C_U$) entering the cooling fluid inlet(s) 300 towards the foundation, through the at least one platform 132 and/or to at least one side of the at least one platform 132. For example, in at least one embodiment, the intake plenum 306 may be fluidly coupled to a platform passage 208 defined by the platform 132. The platform passage 208 may be a permeable portion of the platform 132 (e.g., a grate, a vent, or a series of perforations) positioned adjacent to the threshold 122 of tower door frame 120. The platform passage 208 may be fluidly coupled to an additional flow guiding structure 402 positioned between the foundation 134 and the platform 132. In an additional embodiment, the intake plenum 306 may be fluidly coupled to an additional flow guiding structure 402 positioned perpendicular to the threshold 122. In yet another embodiment, more than one intake plenum 306 may be coupled to the tower door 118, with at least one intake plenum 306 being fluidly coupled to the platform passage 208, while at least one additional intake plenum 306 being coupled to an additional flow guiding structure 402 positioned adjacent to the tower door 118.

It should be appreciated that the fluid coupling of the cooling fluid inlet(s) 300 to the corresponding flow guiding structures 402 may require a temporary seal 210 (FIG. 4). For example, the intake plenum 306 may be temporarily sealed to the platform passage 208 whenever the tower door 118 is in a closed position. In an embodiment, the seal 210 may be a loose-fit seal. For example, the seal 210 may include a curtain or bristles coupled to the intake plenum 306. Alternatively, the seal 210 may be a spring-loaded or magnetic seal, which may retract into the platform 132 or the intake plenum 306 whenever the tower door 118 is transitioned from a closed state to an open state.

Referring still to FIG. 4, in an additional embodiment, the cooling system 200 may also include a maintenance location 408 arranged adjacent to one or more of the plurality of flow guiding structures 402. Thus, the maintenance location 408 may permit access to the filtration assembly 400 so that the filtration assembly 400, or components thereof, may be inspected, cleaned, serviced, repaired, or replaced. In at least one embodiment, the maintenance location 408 may be an access door or hatch integral with the platform 132. In an additional embodiment, the maintenance location 408 may be an access door or hatch integral with a vertical side 410 of the filtration assembly 400.

Additionally, as shown, the filtration assembly 400 may include at least one cleanout tray 412. The cleanout tray 412 may be positioned within the filtration assembly 400 at a location where the particulate matter may accumulate. Accordingly, the cleanout tray 412 may be configured to be extracted from the filtration assembly 400 in order to facilitate the removal of the particulate accumulation.

Referring still to FIG. 4, in one embodiment, the cooling system 200 may also include at least one flow sensor 212 in fluid communication with the cooling fluid inlet(s) 300 and/or the cooling fluid outlet(s) 204. The flow sensor 212 may facilitate monitoring of a flow rate of the cooling fluid ($C_U$). For example, in an embodiment, a first flow sensor 214 may be fluidly coupled to the cooling fluid inlet(s) 300. A second flow sensor 216 may be fluidly coupled to the cooling fluid outlet(s) 204. In such embodiments, the outputs of the first and second flow sensors 214, 216 may be compared to determine a reduction in a cooling fluid ($C_U$) flow through the filtration assembly 400. A baseline pressure differential may be known or measured for an unobstructed filtration assembly 400 (e.g. a filtration assembly without clogs or obstructions). As such, an increase in the measured pressure differential may indicate a clogged filter element, excessive particulate accumulation, or other obstruction in the cooling system 200, and thus, a need for a maintenance procedure to be performed on the cooling system 200.

In yet another embodiment, the cooling system 200 may also include a blower or a fan 218 positioned within the tower 102. The blower or fan 218 may be oriented so as to increase the flow the cooling fluid ($C_U$) through the plurality of flow guiding structures 402. It should be appreciated that the fan or blower 218 may augment a naturally occurring chimney effect within the tower 102. This augmentation of the chimney effect by the fan or blower 218 may, at least partially, compensate for a reduction in flow pressure of the cooling fluid ($C_U$) due to filter elements 404, or other obstructions in the cooling system 200.

Referring still to FIG. 4, and also back to FIG. 2, the cooling system 200 may, as mentioned previously, also include the tower filtration assembly 206. The tower filtration assembly 206 may be positioned between the platform(s) 132 and the nacelle 106. In addition, the tower filtration assembly 206 may be in fluid communication with the cooling fluid outlet(s) 204. The tower filtration assembly 206 may include a tower filter element 207. In an embodiment, the tower filter element 207 may be a synthetic or natural mesh filter media.

Like the filtration assembly 400, the tower filtration assembly 206 may also include a plurality of flow guiding structures 402 positioned so as to provide a number flow direction changes and/or flow velocity changes to a cooling fluid ($C_U$) flow. Alternatively, the tower filtration assembly 206 may include both the tower filter element 207 and the plurality of flow guiding structures 402. In at least one embodiment, the tower filtration assembly 206 may be coupled to the inner face 133 of the tower door 118. In an embodiment, the tower filtration assembly 206, including the tower filter element 207, may be coupled to the upper portion 304 of the tower door 118, while the filtration assembly 400 may be fluidly coupled to the lower portion 305 of the tower door 118. It should be appreciated that in such a configuration, the flow of filtered cooling fluid ($C_F$) exiting the tower filtration assembly 206 may augment the flow of filtered cooling fluid ($C_F$) exiting the filtration assembly 400. Alternatively, the tower filtration assembly 206 may be positioned in proximity with the nacelle 106 so that the flow of filtered cooling fluid ($C_F$) exiting the tower filtration assembly 206 may be primarily directed to providing additional filtered cooling fluid ($C_F$) to the nacelle 106.

Figure 5:
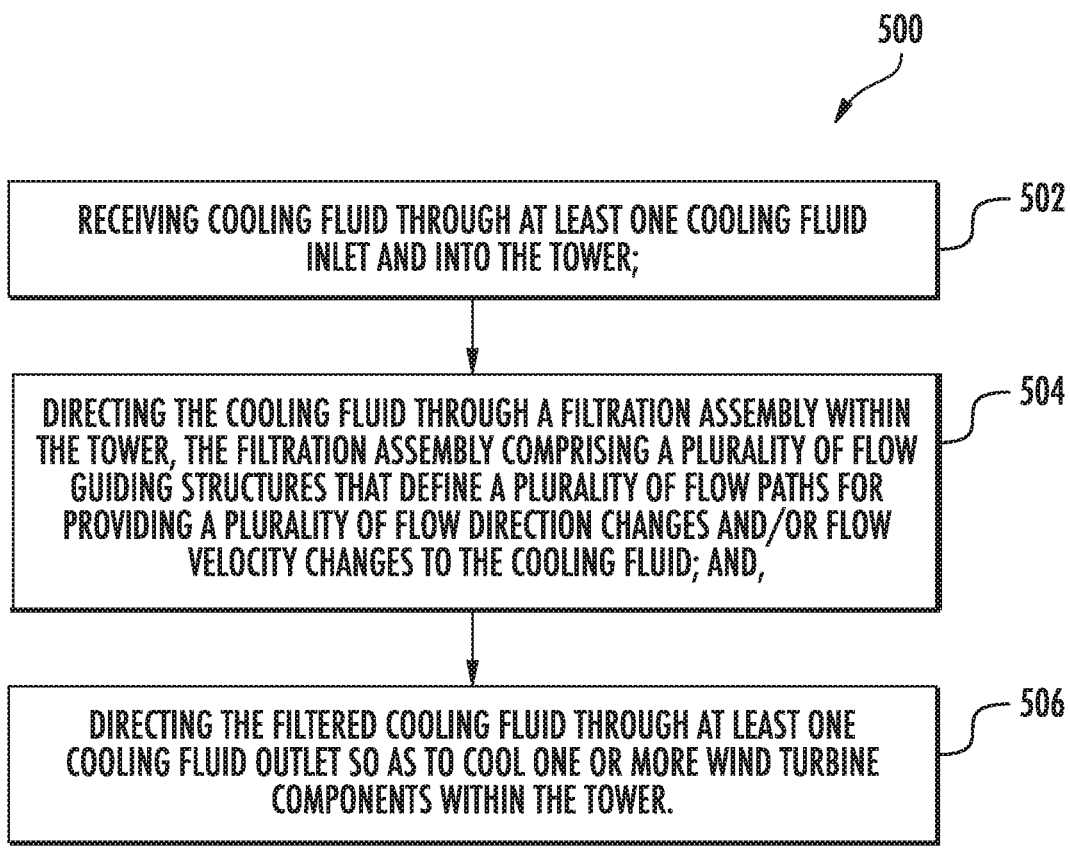
FIG. 5 illustrates a flow diagram of one embodiment of a method for cooling a tower of a wind turbine according to the present disclosure.

Referring to FIG. 5, a flow diagram of one embodiment of a method 500 for cooling a tower of a wind turbine is illustrated. The method 500 may be implemented using, for instance, the cooling system 200 discussed above with references to FIGS. 1-4. FIG. 5 depicts steps performed in a particular order for purposes of illustration and discussion. Those of ordinary skill in the art, using the disclosures provided herein, will understand that various steps of the method 500, or any of the methods disclosed herein, may be adapted, modified, rearranged, performed simultaneously, or modified in various ways without deviating from the scope of the present disclosure.

As shown at (502), the method 500 may include receiving cooling fluid through at least one cooling fluid inlet and into the tower. As shown at (504), the method 500 may include directing the cooling fluid through a filtration assembly within the tower. The filtration assembly may include a plurality of flow guiding structures that define a plurality of flow paths for providing a plurality of flow direction changes and/or flow velocity changes to the cooling fluid. Additionally, as shown at (506), the method 500 may include directing the filtered cooling fluid through at least one cooling fluid outlet so as to cool one or more wind turbine components within the tower.

In additional embodiments, the method 500 may also, in accordance with the present disclosure, include directing the cooling fluid through a plurality of 180-degree turns defined by the plurality of flow guiding structures so as to slow the cooling fluid and allow one or more particles in the cooling fluid to settle out.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

For reasons of completeness, various aspects of the present disclosure are set out in the following numbered clauses:

Clause 1. A system for cooling a tower of a wind turbine, the system comprising:

at least one cooling fluid inlet for receiving a cooling fluid into the tower, the at least one cooling fluid inlet arranged in a tower wall of the tower of the wind turbine;

a filtration assembly arranged within the tower, the filtration assembly comprising a plurality of flow guiding structures that define a plurality of flow paths for providing a plurality of flow direction changes and/or flow velocity changes to the cooling fluid; and, at least one cooling fluid outlet for directing the filtered cooling fluid within the tower.

Clause 2. The system of clause 1, wherein the at least one cooling fluid inlet is set within at least one of a tower door or a tower door frame of the tower.

Clause 3. The system of any preceding clause, wherein one or more of the plurality of flow guiding structures are integral with at least one platform positioned within the tower at a predetermined height above a foundation of the wind turbine.

Clause 4. The system of any preceding clause, wherein the plurality of flow guiding structures is positioned between the at least one platform and the foundation.

Clause 5. The system of any preceding clause, wherein the plurality of flow paths direct the cooling fluid entering the at least one cooling fluid inlet towards the foundation through the at least one platform and/or to at least one side of the at least one platform.

Clause 6. The system of clause 1, 2, or 3, further comprising a tower filtration assembly positioned between the at least one platform and a nacelle of the wind turbine, the tower filtration assembly being in fluid communication with the at least one cooling fluid outlet, the tower filtration assembly comprising at least one of a filter element or a plurality of flow guiding structures.

Clause 7. The system of any preceding clause, wherein the plurality of flow guiding structures define a plurality of 180-degree turns for the cooling fluid.

Clause 8. The system of any preceding clause, wherein the filtration assembly further comprises at least one of a filter element or particle separation element for further filtering the cooling fluid as the cooling fluid flows through the plurality of flow guiding structures and/or exits the at least one cooling fluid outlet.

Clause 9. The system of any preceding clause, further comprising a maintenance location arranged adjacent to one or more of the plurality of flow guiding structures, the maintenance location providing access to the plurality of flow guiding structures such that the filtration assembly can be cleaned and/or replaced.

Clause 10. The system of any preceding clause, wherein the maintenance location is an access door integral with at least one of a vertical side of the filter assembly or the at least one platform.

Clause 11. The system of any preceding clause, further comprising at least one flow sensor in fluid communication with the at least one cooling fluid inlet and/or the at least one cooling fluid outlet so as to monitor a flow rate of the cooling fluid.

Clause 12. The system of any preceding clause, further comprising at least one of a blower or a fan positioned within the tower and oriented so as to increase a flow of the cooling fluid through the plurality of flow guiding structures.

Clause 13. A method for cooling a tower of a wind turbine, the method comprising:

receiving cooling fluid through at least one cooling fluid inlet and into the tower;

directing the cooling fluid through a filtration assembly within the tower, the filtration assembly comprising a plurality of flow guiding structures that define a plurality of flow paths for providing a plurality of flow direction changes and/or flow velocity changes to the cooling fluid; and, directing the filtered cooling fluid through at least one cooling fluid outlet so as to cool one or more wind turbine components within the tower.

Clause 14. The method of clause 13, wherein the at least one cooling fluid inlet is set within at least one of a tower door or a tower door frame of the tower.

Clause 15. The method of clause 13 or 14, wherein directing the cooling fluid through the filtration assembly further comprises directing the cooling fluid through at least one flow guiding structure of the plurality of flow guiding structures that is integral with at least one platform positioned within the tower at a predetermined height above a foundation of the wind turbine.

Clause 16. The method of clause 13, 14, or 15, wherein directing the cooling fluid through the filtration assembly within the tower further comprises directing the cooling fluid towards the foundation through the at least one platform and/or to at least one side of the at least one platform.

Clause 17. The method of clause 13, 14, or 15, wherein the filtration assembly is positioned between the at least one platform and the foundation of the wind turbine.

Clause 18. The method of clause 13, 14, 15, 16, or 17, wherein directing the cooling fluid through the filtration assembly further comprises directing the cooling fluid through a plurality of 180-degree turns defined by the plurality of flow guiding structures so as to slow the cooling fluid and allow one or more particles in the cooling fluid to settle out.

Clause 19. The method of clause 13, 14, 15, 16, 17, or 18, wherein the filtration assembly further comprises at least one of a filter element or a particle separation element arranged in one or more of the plurality of flow paths so as to filter the cooling fluid.

Clause 20. A wind turbine, comprising:

a tower secured atop a foundation;

a nacelle mounted atop the tower;

a rotor mounted to the nacelle;

at least one platform positioned within the tower at a predetermined height above the foundation; and, a cooling system positioned within the tower, the cooling system comprising:

at least one cooling fluid inlet arranged in a tower wall of the tower of the wind turbine;

a filtration assembly in fluid communication with the at least one cooling fluid inlet and positioned between the platform and the foundation, the filtration assembly comprising a plurality of flow guiding structures that define a plurality of flow paths for providing a plurality of flow direction changes and/or flow velocity changes to the cooling fluid;

at least one cooling fluid outlet in fluid communication with the filtration assembly and positioned so as to direct the filtered cooling fluid within the tower.

What is claimed is:

1. A system for cooling a tower of a wind turbine, the system comprising:

at least one cooling fluid inlet for receiving a cooling fluid into the tower, the at least one cooling fluid inlet arranged in a tower wall of the tower of the wind turbine, the at least one cooling fluid inlet comprising at least one opening defined by a tower door;

an intake plenum coupled to an inner face of the tower door and surrounding the at least one opening defined by the tower door;

at least one platform positioned within the tower at a predetermined height above a foundation of the wind turbine, wherein the predetermined height positions the at least one platform between the foundation of the wind turbine and the tower door, wherein the at least one platform defines a platform passage;

a seal positioned between the intake plenum and the platform passage so as to fluidly couple the intake plenum to the platform passage;

a filtration assembly arranged within the tower, the filtration assembly comprising a plurality of flow guiding structures that define a plurality of flow paths for providing a plurality of flow direction changes and/or flow velocity changes to the cooling fluid; and at least one cooling fluid outlet for directing the filtered cooling fluid within the tower.

2. The system of claim 1, wherein the at least one cooling fluid inlet further comprises an opening defined by a tower door frame of the tower.

3. The system of claim 1, wherein one or more of the plurality of flow guiding structures is integral with the at least one platform.

4. The system of claim 3, wherein the plurality of flow guiding structures is positioned between the at least one platform and the foundation.

5. The system of claim 4, wherein the plenum direct the cooling fluid entering the at least one cooling fluid inlet towards the foundation through the at least one platform and/or to at least one side of the at least one platform.

6. The system of claim 3, further comprising a tower filtration assembly positioned between the at least one platform and a nacelle of the wind turbine, the tower filtration assembly being in fluid communication with at least one additional cooling fluid outlet, the tower filtration assembly comprising at least one of a filter element or an additional plurality of flow guiding structures.

7. The system of claim 1, wherein the plurality of flow guiding structures defines a plurality of 180-degree turns for the cooling fluid.

8. The system of claim 1, wherein the filtration assembly further comprises at least one of a filter element or particle separation element for further filtering the cooling fluid as the cooling fluid flows through the plurality of flow guiding structures and/or exits the at least one cooling fluid outlet.

9. The system of claim 1, further comprising a maintenance location arranged adjacent to one or more of the plurality of flow guiding structures, the maintenance location providing access to the plurality of flow guiding structures, wherein the maintenance location is configured to facilitate a cleaning of the filtration assembly.

10. The system of claim 9, wherein the maintenance location is an access door integral with at least one of a vertical side of the filtration assembly or at least one platform.

11. The system of claim 1, further comprising at least one flow sensor in fluid communication with the at least one cooling fluid inlet and/or the at least one cooling fluid outlet so as to monitor a flow rate of the cooling fluid.

12. The system of claim 1, further comprising at least one of a blower or a fan positioned within the tower and oriented so as to increase a flow of the cooling fluid through the plurality of flow guiding structures.

13. A method for cooling a tower of a wind turbine, the method comprising:

receiving a cooling fluid through at least one cooling fluid inlet and into the tower, the at least one cooling fluid inlet comprising at least one opening defined by a tower door;

sealing, via a seal, an intake plenum coupled to an inner face of the tower door to a platform passage defined by at least one platform, wherein the at least one platform is positioned within the tower at a predetermined height above a foundation of the wind turbine, wherein the predetermined height positions the at least one platform between the foundation of the wind turbine and the tower door, and wherein the intake plenum surrounds the at least one opening defined by the tower door;

directing the cooling fluid through a filtration assembly within the tower, the filtration assembly comprising a plurality of flow guiding structures that define a plurality of flow paths for providing a plurality of flow direction changes and/or flow velocity changes to the cooling fluid; and directing the filtered cooling fluid through at least one cooling fluid outlet so as to cool one or more wind turbine components within the tower.

14. The method of claim 13, wherein the at least one cooling fluid inlet further comprises an opening defined by a tower door frame of the tower.

15. The method of claim 13, wherein directing the cooling fluid through the filtration assembly further comprises directing the cooling fluid through at least one flow guiding structure of the plurality of flow guiding structures that is integral with the at least one platform.

16. The method of claim 15, wherein directing the cooling fluid through the filtration assembly within the tower further comprises directing the cooling fluid towards the foundation through the at least one platform and/or to at least one side of the at least one platform.

17. The method of claim 15, wherein the filtration assembly is positioned between the at least one platform and the foundation of the wind turbine.

18. The method of claim 13, wherein directing the cooling fluid through the filtration assembly further comprises directing the cooling fluid through a plurality of 180-degree turns defined by the plurality of flow guiding structures so as to slow the cooling fluid and allow one or more particles in the cooling fluid to settle out.

19. The method of claim 13, wherein the filtration assembly further comprises at least one of a filter element or a particle separation element arranged in one or more of the plurality of flow paths so as to filter the cooling fluid.

20. A wind turbine, comprising:

a tower secured atop a foundation;

a nacelle mounted atop the tower;

a rotor mounted to the nacelle;

at least one platform positioned within the tower at a predetermined height above the foundation; and a cooling system positioned within the tower, the cooling system comprising:

at least one cooling fluid inlet arranged in a tower wall of the tower of the wind turbine, the at least one cooling fluid inlet comprising at least one opening defined by a tower door, an intake plenum coupled to an inner face of the tower door and surrounding the at least one opening defined by the tower door, at least one platform positioned within the tower at a predetermined height above a foundation of the wind turbine, wherein the predetermined height positions the at least one platform between the foundation of the wind turbine and the tower door, wherein the at least one platform defines a platform passage, a seal positioned between the intake plenum and the platform passage so as to fluidly couple the intake plenum to the platform passage, a filtration assembly in fluid communication with the at least one cooling fluid inlet and positioned between the platform and the foundation, the filtration assembly comprising a plurality of flow guiding structures that define a plurality of flow paths for providing a plurality of flow direction changes and/or flow velocity changes to a cooling fluid, and at least one cooling fluid outlet in fluid communication with the filtration assembly and positioned so as to direct the filtered cooling fluid within the tower.

* * * * *